United States Patent [19]
Webb, Jr. et al.

[11] 4,038,656
[45] July 26, 1977

[54] HELICOPTER DISCRIMINATION APPARATUS FOR THE MURINE RADAR

[75] Inventors: John G. Webb, Jr., Sandia Park, N. Mex.; Roger M. Gray, Dallas, Tex.

[73] Assignee: The United States of America as represented by the Secretary of the Air Force, Washington, D.C.

[21] Appl. No.: 456,574

[22] Filed: Mar. 27, 1974

[51] Int. Cl.² ............................................. G01S 7/02
[52] U.S. Cl. ............................... 343/5 SA; 343/18 E
[58] Field of Search .............. 343/17.1 R, 18 E, 5 SA

[56] References Cited
U.S. PATENT DOCUMENTS

| 3,091,763 | 5/1963 | Mortley et al. | 343/17.1 R |
| 3,277,473 | 10/1966 | Calhoon et al. | 343/17.1 R X |
| 3,364,482 | 1/1968 | Sones | 343/17.1 R X |

Primary Examiner—T.H. Tubbesing
Attorney, Agent, or Firm—Joseph E. Rusz; William Stepanishen

[57] ABSTRACT

A helicopter discrimination apparatus for a radar utilizing doppler filtering to discriminate between a missile and ground clutter. The short duration of the doppler filter pulses which are emitted by helicopter rotor blades are processed to prevent false alarms, thus allowing the radar-protected helicopter to operate in formation with other helicopters while maintaining protection against infra-red-seeking missiles.

7 Claims, 2 Drawing Figures

HELICOPTER DISCRIMINATION APPARATUS FOR THE MURINE RADAR

BACKGROUND OF THE INVENTION

The present invention relates broadly to a helicopter radar system and in particular to a helicopter discrimination apparatus having the capability to discriminate between missiles and assorted clutter.

The murine radar is a helicopter-borne system which is designed to detect infrared-seeking interceptor missiles, and launch a flare in time to decoy the missile away from the helicopter. In order to separate the missile's radar return from that of the ground doppler filtering is employed. This is possible because the doppler shift which is produced by an approaching missile is higher than any doppler component that is received from the ground. However, the tip velocity of the helicopter rotor blade is within the range of velocities which are achieved by an intercepter missile and thus signals from nearby helicopters may have doppler frequency components which are high enough to cause false radar alarms. Since the operation of helicopters in the vicinity of or in formation with other helicopters is a common tactical requirement, it is important that these false radar alarms be minimized or eliminated. Characteristics of radar signals from helicopter rotor blades have been studied both in the time domain and in the doppler frequency domain. It has been observed that a characteristic of the rotor blade time signatures after doppler filtering is its very short duration during each revolution of the rotor blade. This time duration is typically 5 msec with a period of 83 msec. The present invention provides an apparatus which rejects non-missile related doppler signals and thus prevents false alarms.

SUMMARY

The present invention utilizes a helicopter discrimination apparatus to discriminate between a missile and other clutter which is associated with helicopter rotor blade signatures and ground clutter. The discrimination apparatus allows doppler signals with a duration in excess of 8 msec to be processed within the Murine radar and rejects those doppler signals with shorter time duration, thereby eliminating helicopter rotor blade signals. The discrimination apparatus also rejects false alarms which are produced by clutter having time durations shorter than 100 msec while allowing signals which are produced by approaching Sam missile to be processed.

It is one object of the invention to provide improved helicopter discrimination apparatus having the capability to discriminate between the radar signals of a helicopter rotor blade and an approaching Sam missile.

It is another object of the invention to provide an improved helicopter discrimination apparatus which processes doppler signals having time durations in excess of 8 msec.

It is yet another object of the invention to provide an improved helicopter discrimination apparatus having the capabillity of discriminating between the doppler frequency shift produced by an approaching missile as compared to any other doppler frequency component which is reflected from the ground and then off the rotor blades of the radar-carrying helicopter.

These and other advantages, features and objects of the invention will become more apparent from the following description taken in connection with the illustrative embodiment in the accompanying drawings.

DESCRIPTION OF THE PREFERRED EMBODIMENT

One of the characteristics of a helicopter rotor blade signature provides the basis for a time duration discrimination circuit to be constructed which rejects rotor blade doppler signals while allowing doppler frequency signals from approaching missiles to be processed. This characteristic is the short duration of the doppler signal which is received from each rotor blade. The time duration is typically less than 5 msec from the main rotor blades and 8 msec from the tail rotor. Whereas, the expected signal time duration from an approaching interceptor missile is in excess of 100 msec. Thus, time discrimination between the two types of doppler frequency signals is possible on the basis of time duration. The present invention provides a helicopter discrimination apparatus which rejects doppler signals of less than 8 msec time duration and allows those which last longer to be processed.

Figure 1:
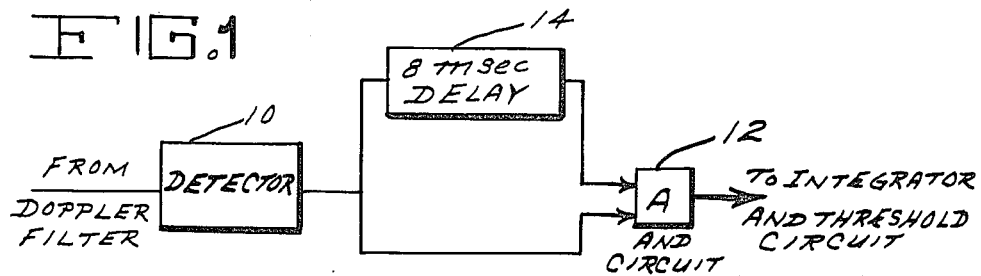
FIG. 1 is a block diagram of the helicopter discrimination apparatus having a capability of rejecting doppler signals of less than 8 msec time duration.

Referring now to FIG. 1, there is shown a helicopter discrimination apparatus utilizing a detector 10 to receive doppler frequency signals from a doppler filter (not shown) which is part of the Murine radar system. After detection, the output of the detector 10 is fed directly to an AND gate 12 and to a delay unit 14. The doppler signal from the detector 10 is applied to delay unit 14 to be delayed in time by a predetermined time. In the present example, the predetermined time is 8 milliseconds. The delayed doppler signal from the delay unit is applied to AND gate 12. The AND gate 12 compares the doppler signal from detector 10 with the delayed doppler signal from delay unit 14 and provides an output signal when the two signals coincide. Thus, the AND gate 12 will produce an output signal only when the detector 10 output signal has a time duration which is in excess of 8 milliseconds.

Figure 2:
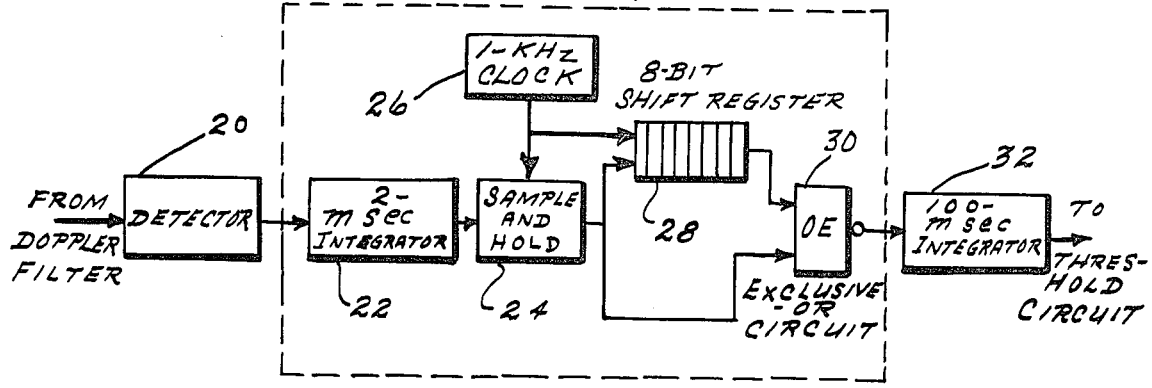
FIG. 2 is a block diagram of an improved helicopter discrimination apparatus which is utilized to implement time duration discrimination.

The practical difficulty of obtaining an analog delay of 8 msec. is well known to those skilled in the art, therefore, the circuit in FIG. 1 was implemented digitally as shown in FIG. 2. There is shown in FIG. 2 a time duration discrimination apparatus to discriminate between false radar alarms and approaching interceptor missiles. The input doppler frequency signal from the doppler filter (not shown) in the Murine radar is applied to detector 20. The detected doppler frequency signal is then applied to integrator 22 where the doppler signal is smoothed by the 2 msec integrator to remove the cycle-to-cycle amplitude variations. The doppler signal is then applied to the sample and hold unit 24 where it is sampled at a 1 kHz rate. A clock unit 26 having a 1 kilohertz clock rate provides the sample rate to sample and hold unit 24. The sample and hold unit 24 then applies the digitized doppler signal to shift register 28 which receives a one kilohertz clock rate from clock unit 26. The shift register 28 is an 8 bit shift register. The doppler signal is loaded into an 8-bit shift register 28 which is advanced at the same 1 kHz rate as the sample and hold unit 24. The shift register 28 thus provides an 8 msec delay. The output of the shift register 28, together with the undelayed output of the sampling circuit 24 is fed to an exclusive-OR gate 30 where the delayed and undelayed doppler signals are compared.

The exclusive-OR gate 30 replaces the AND gate 12 of FIG. 1, and is required to allow the helicopter discrimination apparatus to function properly in the presence of noise. The truth table of the exclusive-OR circuit is given in the table below. As shown, the output is one only if both inputs are the same, and zero if they are different. If only noise is present at the doppler filter output, both inputs to the exclusive-OR are random sequences of equally probable 1-msec-long ones and zeros. In this case, according to the truth table, the output is also a random sequence of equally probable 1-msec-long ones and zeros. When this sequence is applied to the 100-msec integrator 32, the integrator output mean and variance are $\mu_n$ and $\sigma_n^2$, respectively. Thus, whenever only noise is present at the doppler filter output, these values of means and variance are obtained at the input to the threshold circuit. The threshold level is set at $\mu_n + m\sigma_n$, and $m$ is chosen for the desired false alarm probability.

TABLE I

| INPUT A | INPUT B | OUTPUT |
|---------|---------|--------|
| 0 | 0 | 1 |
| 0 | 1 | 0 |
| 1 | 0 | 0 |
| 1 | 1 | 1 |

In theory, the helicopter rotor blade signals are present at the doppler filter output in addition to noise. During each rotor blade signal, the undelayed input to the exclusive-OR gate 30 is a sequence of all ones, and for the first 8 msec the delayed input is still a random noise sequence of ones and zeros. It may be seen from the exclusive-OR truth table that the output in this case remains a random noise sequence of ones and zeros. At the end of 8 msec, the delayed input becomes all ones, while the undelayed input becomes a random noise sequence. Thus, once again the output remains a random noise sequence of ones and zeros. The result is that there is no change in the exclusive-OR output no matter whether only noise or rotor blade signals and noise are present in the output from doppler filter. The 100-msec integrator 32 output means and variance remain at $\mu_n$ and $\sigma_n^2$, and no threshold crossings occur.

Finally, suppose an approaching missile signal is present in the output from the doppler filter, and the signal remains there for longer than 8 msec. In this case, after the first 8 msec both inputs to the exclusive-OR gate 30 are sequences of all ones. From the truth table, the output is then a sequence of all ones. Now the output mean of the 100-msec integrator 32 rises to a new value, $\mu_s$. If the signal remains long enough, the output means will rise to a value such that $\mu_s > \mu_n + m\sigma_n$, and threshold crossing occurs. Since an approaching missile signal is expected to last at least 100 msec, the system sensitivity can be such that a low dud probability (i.e., a low probability that $\mu_s < \mu_n + m\sigma_n$) is achieved with a signal-to-noise ratio of 0 dB at the doppler filter output.

The time duration discrimination apparatus of FIG. 2 has been tested in the signal channel between the detector and 100-msec integrator of the Murine radar. It should be noted that the present invention utilizes conventional devices which are well known to those skilled in the art. The circuits which are herein shown may be found in any standard reference book, such as, "Pulse, ditigal and switching waveforms," by Millman and Taub. The radar was then tested with a helicopter under the conditions listed in Table 1. In tests in which the discrimination circuit was disabled and the detector output was connected directly to the 100-msec integrator, the following results were obtained. The main rotor blade signals were shown at the doppler filter output, and the difference circuit produced an output responding strongly to these signals. The discriminator apparatus was enabled and the tests were repeated. The following results were obtained. Once again the main rotor signals appeared at the doppler filter output (plus some weaker tail rotor signals in between), however, the difference circuit output had no response at all to the helicopter signals.

An additional benefit which is obtained from the use of the time duration discrimination apparatus is the reduction of false alarms that are caused by interaction of the radar-carrying helicopter's own rotor blades with ground clutter. Such false alarms arise when ground-clutter signals, which normally do not have a large enough doppler shift to be passed by the doppler filter, are secondarily reflected from the rotor blades of the radar-carrying helicopter. This causes an additional doppler shift because of the rotor blade velocity, which is sufficient to shift the ground clutter signals up into the doppler filter passband. False alarms which are produced by this process will hereafter be referred to as "ownship" false alarms, to distinguish them from false alarms produced by the rotor blades of other helicopters in the vicinity of the radar-carrying helicopter. It has been found through extensive testing that cases of ownship false alarms contain very few rotor interaction signals which last longer than 8 msec, and that even these may not be long or strong enough after passing through the time duration discriminator to cause false alarms. Thus the discriminator should significantly reduce the probability of ownership false alarms.

Although the invention has been described with reference to a particular embodiment, it will be understood to those skilled in the art that the invention is capable of a variety of alternative embodiments within the spirit and scope of the of the appended claims.

It is claimed:

1. A helicopter discrimination apparatus for the Murine radar comprising in combination:
   detecting means receiving a doppler signal, said detecting means detecting said doppler signal, said detecting means providing output doppler signal in response to said doppler signals:
   delay means connected to said detecting means to receive said output doppler signal, said delay means having a predetermined time delay, said delay means delaying said output doppler signal by said predetermined time to provide a delayed doppler signal, said predetermined time delay is 8 milliseconds, and,
   logic control means connected to both said detecting means and said delay means to receive said output doppler signal and said delay doppler signal, said logic control means providing an output signal when said output doppler signal has a time period greater than said delayed doppler signal.

2. A helicopter discrimination apparatus for the Murine radar comprising in combination:

detecting means receiving a doppler signal, said detecting means detecting said doppler signal, said detecting means providing output doppler signal in response to said doppler signals, delay means connected to said detecting means to receive said output doppler signal, said delay means having a predetermined time delay, said delay means delaying said output doppler signal by said predetermined time to provide a delayed doppler signal, and, logic control means connected to both said detecting means and said delay means to receive said output doppler signal and said delayed doppler signal, said logic control means providing an output signal when said output doppler signal has a time period greater than said delayed doppler signal, said time period is in excess of 8 milliseconds.

3. A helicopter discrimination apparatus for the Murine radar comprising in combination:
- detecting means receiving a doppler signal, said detecting means detecting said doppler signal, said detecting means providing output doppler signal in response to said doppler signals,
- delay means connected to said detecting means to receive said output doppler signal, said delay means having a predetermined time delay, said delay means delaying said output doppler signal by said predetermined time to provide a delayed doppler signal,
- an integrator connected to said detecting means to receive said output doppler signal, said integrator smoothing said output doppler signal,
- a clock unit to provide a one kilohertz signal,
- a sample and hold unit to receive said output doppler signal, said sample and hold unit connected to said clock unit to receive said one kilohertz signal, said sample and hold unit sampling said output doppler signal at a one kilohertz rate,
- a shift register connected to said sample and hold unit to receive said output doppler signal, said shift register connected to said clock unit to receive said one kilohertz signal, said shift register advancing at said one kilohertz rate, and
- logic control means connected to both said detecting means and said delay means to receive said output doppler signal and said delayed doppler signal, said logic control means providing an output signal when said output doppler signal has a time period greater than said delayed doppler signal.

4. A helicopter discrimination apparatus as described in claim 3 wherein said shift register is an eight bit shift register, said shift register having an 8 millisecond delay time.

5. A helicopter discrimination apparatus as described in claim 4 wherein said logic control means is an exclusive OR gate to compare said delayed doppler signal and said output doppler signal, said exclusive or gate providing an output when said delayed doppler signal and said output doppler signal coincide.

6. A helicopter discrimination apparatus as described in claim 5 further including integrator means connected to said exclusive or gate, said integrator means having a predetermined threshold level, said predetermined threshold level being chosen to prevent false alarms, said integrator means preventing noise below the predetermined threshold level from producing an output indication.

7. A helicopter discrimination apparatus as described in claim 6 wherein said integrator means has an integration time of 100 milliseconds.

* * * * *